(12) United States Patent
Meckler et al.

(10) Patent No.: US 9,558,281 B2
(45) Date of Patent: Jan. 31, 2017

(54) SYSTEM AND METHOD FOR SCREENCAST CREATION AND ABRIDGING BASED ON USER WEB BROWSING

(71) Applicant: Orange, Paris (FR)

(72) Inventors: Brian Meckler, Kensington, CA (US); Wilson Lau, San Francisco, CA (US)

(73) Assignee: Orange, Paris (FR)

( * ) Notice: Subject to any disclaimer, the term of this patent is extended or adjusted under 35 U.S.C. 154(b) by 292 days.

(21) Appl. No.: 14/040,039

(22) Filed: Sep. 27, 2013

(65) Prior Publication Data

US 2014/0095979 A1  Apr. 3, 2014

Related U.S. Application Data (60) Provisional application No. 61/707,522, filed on Sep. 28, 2012.

(51) Int. Cl.
*G06F 17/30* (2006.01)
*G06F 3/06* (2006.01)
*G06F 17/22* (2006.01)

(52) U.S. Cl.
CPC ....... *G06F 17/30873* (2013.01); *G06F 3/0605* (2013.01); *G06F 17/2247* (2013.01)

(58) Field of Classification Search
CPC  G06F 17/2247; G06F 17/30873; G06F 11/34; H04L 67/22
See application file for complete search history.

(56) References Cited

U.S. PATENT DOCUMENTS

| | | | |
|---|---|---|---|
| 8,700,464 B1* | 4/2014 | McAllister | G06Q 30/02 705/14.41 |
| 9,154,365 B1* | 10/2015 | Henry | |
| 2005/0256956 A1* | 11/2005 | Littlefield et al. | 709/225 |
| 2006/0159080 A1* | 7/2006 | Mazzaferri | H04L 29/06027 370/389 |
| 2009/0063968 A1* | 3/2009 | Wenig et al. | 715/704 |
| 2010/0268694 A1* | 10/2010 | Denoue et al. | 707/693 |
| 2011/0213822 A1* | 9/2011 | Yavilevich | 709/202 |
| 2011/0218997 A1* | 9/2011 | Boiman et al. | 707/737 |
| 2013/0110978 A1* | 5/2013 | Gordon et al. | 709/218 |
| 2014/0026025 A1* | 1/2014 | Smith | 715/230 |
| 2014/0115506 A1* | 4/2014 | George et al. | 715/764 |

* cited by examiner

*Primary Examiner* — Scott Baderman
*Assistant Examiner* — Seung Jung
(74) *Attorney, Agent, or Firm* — David D. Brush; Westman Champlin & Koeher, P.A.

(57) ABSTRACT

A computer-implemented method and system are provided for sharing web pages. The method includes: executing one or more programs stored in a memory of the computer system for generating a representation of a web page that is displayed in a window of a web browser in a user interface of the client computer system; recording the web page over a period of time, the recording including web page changes resulting from input events; recording each input event along with a time stamp associated with the event and associating the time stamp with the event, wherein the recording of the web page, input events, and time stamps are placed in a screencast file; extracting from the screencast file portions related to selected time stamps of the recorded input events; and assembling the portions to generate a combined web page recording.

16 Claims, 5 Drawing Sheets

SYSTEM AND METHOD FOR SCREENCAST CREATION AND ABRIDGING BASED ON USER WEB BROWSING

CROSS-REFERENCE TO RELATED APPLICATION

The present application is based on and claims the benefit of U.S. provisional patent application Ser. No. 61/707,522, filed Sep. 28, 2012, the content of which is hereby incorporated by reference in its entirety.

BACKGROUND

The World-Wide Web has provided enormous amounts of searchable data for individuals and businesses. Employees at many enterprises spend a good portion of their time researching and consuming web-based content by navigating the Web through their web browsers.

Many enterprise projects involve research and data gathering collaboration among groups of individuals. Such collaboration among employees often is the result of processing and re-publishing the web-based information that an initial researcher initially located, analyzed, and filtered using their browser before sharing relevant information with his or her peers.

Historically, the initial searcher would copy and paste text, images, and links believed to be relevant into another document that she would then circulate to other researchers in the group. However, this method consumes a considerable amount of time and does not always produce optimal results. For example, if the initial researcher located a highly relevant link, but became distracted by a follow-on link, the initial researcher might inadvertently omit such a highly relevant link based on being distracted.

What is needed is a better way of aggregating and communicating information associated with a search of the initial searcher that can be shared in a more meaningful way with others in a research group beyond the mere copying and pasting of text, images, and links into a document that is subsequently shared with colleagues.

SUMMARY

In order to provide a better way of aggregating and communicating web-based research, various embodiments of the invention include a system and method that—after performing a search—allows a user to assemble content they found through their browser into meaningful screencasts in an automated way that facilitates collaboration and idea sharing.

The following describes in more detail the system and method by which a user of a computing device configures his browser to automatically record his browsing sessions and specify which screencasts get abridged and shared with others.

A screencast captures an entire browsing experience of a user within a browser. The entire user experience is recorded and any user generated event, like scrolling, clicking, opening a link or a tab, etc., is also generated and recorded along with its time stamp. The user generated event pin-points the right moments when something important happens in the browsing experience. These right moments can be used to extract relevant content from the complete screencasting.

This is preferably done within a browser to permit easy tracking of the user's inputs. Although the invention could include operation in a desktop environment, this is more difficult because the interactions to track become application- and OS-based, and the segregation of events becomes more involved. Within a browser, it can be known from the beginning what type of input is being dealt with.

A computer implemented method for creating screencasts based on user browser sessions may include automatic abridging based on the events triggered in the browser application. By associating a subset of browser events or a plurality of these events with significance levels as well as when the events occurred, time intervals of the screencast can be ranked in terms of importance or other factors.

The creation method also includes user configurable parameters, such as total maximum screencast length or significance, that can be used to determine which splices can be later pieced together automatically. The end result are screencasts that convey key content that was important to the original viewing user but in a highly abridged format that is easier to send and share with others.

Accordingly, a computer-implemented method and system are provided for sharing web pages, comprising: at a client computer system having one or more processors that execute one or more programs stored in a memory of the client computer system: generating a representation of a web page that is displayed in a window of a web browser in a user interface of the client computer system; recording the web page over a period of time, the recording including web page changes resulting from input events; recording each input event along with a time stamp associated with the event and associating the time stamp with the event, wherein the recording of the web page, input events, and time stamps are placed in a screencast file; and at either the client computer system or a server computer system: extracting from the screencast file portions related to selected time stamps of the recorded input events; and assembling the portions to generate a combined web page recording.

DESCRIPTION OF THE DRAWINGS

Various embodiments of the invention are illustrated in the following drawings.

DETAILED DESCRIPTION

Figure 1A:
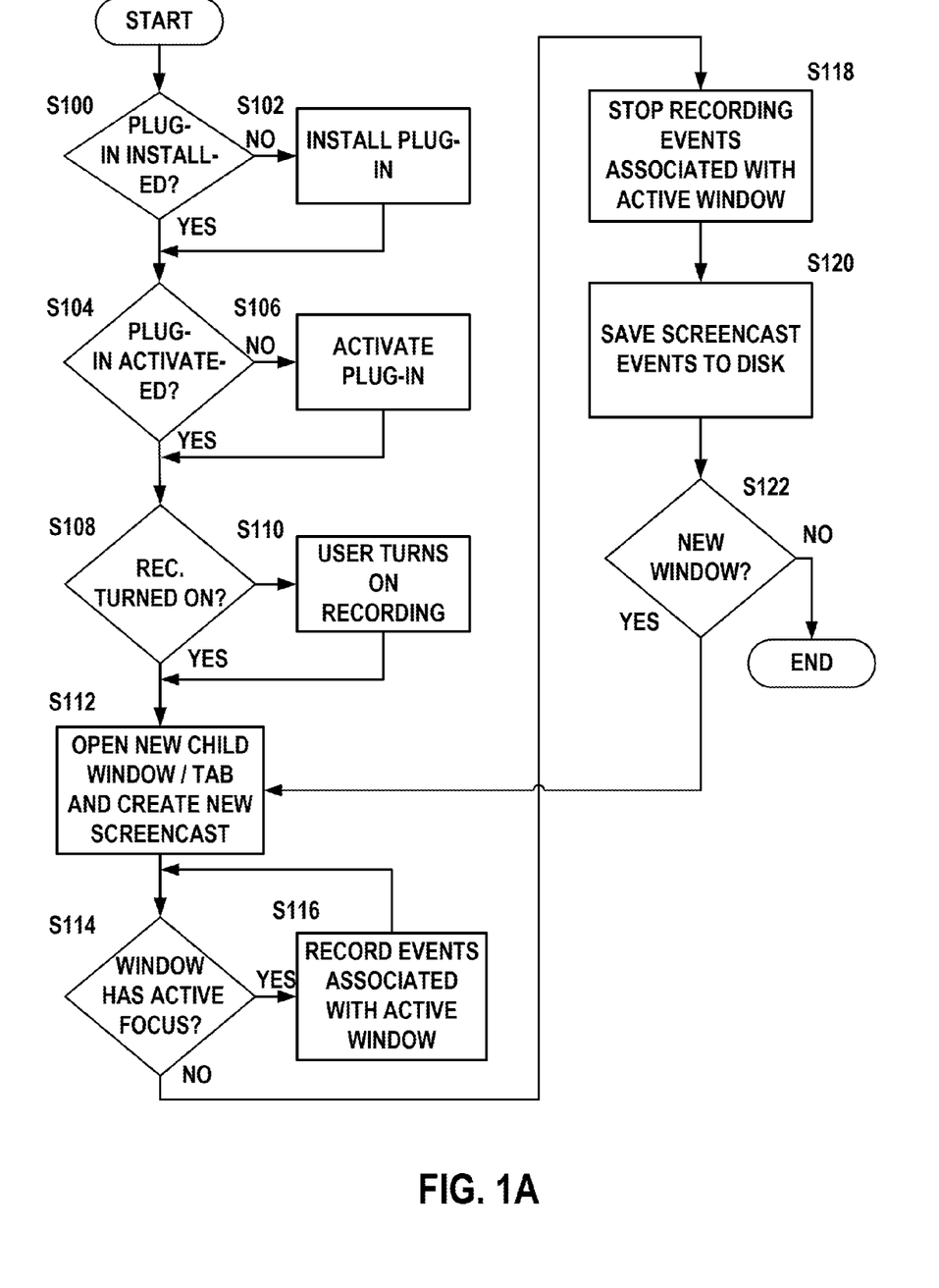
FIGS. 1A, B are flowchart portions illustrating a basic flow of user activity in creating the screencast.
Figure 1B:
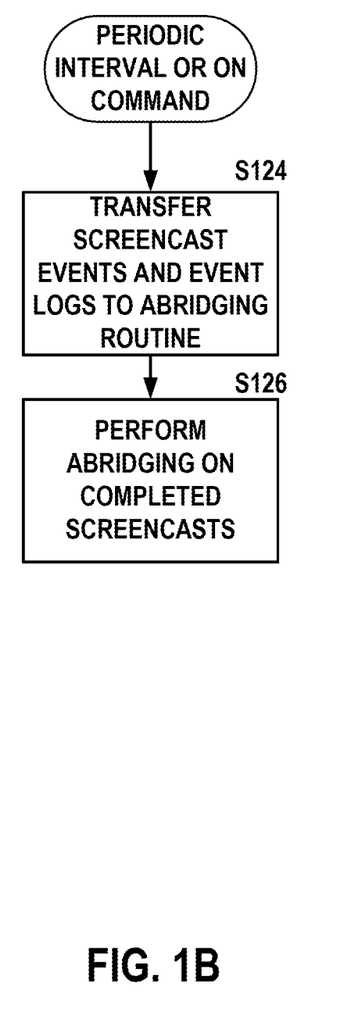

FIGS. 1A and 1B illustrate a basic flow of operations that occur on a user's system. Various embodiments are defined so that a user can have little to no interaction with the components of the system, if desired.

In the embodiment illustrated by FIG. 1, the system is implemented by a browser plug-in, although it should be recognized that it could be implemented by any form of software executing on the user's machine or another network-connected machine.

First, after a researcher 10 initiates their web browser, a check is made S100 to determine if the client software (e.g., a browser plug-in) 120 is installed. If not, the plug-in 120 (FIG. 2) is installed S102, and, once installed, a check is made S104 to see if the plug-in is activated. If not, the plug-in is activated S106. Next, to implement the software, a check is made to see if the recording is turned on S108. If not, the researcher 10 (or client 100) can turn on the recording S110. The recording could be configured to automatically come on in a number of ways, including upon initiation of the web browser, upon browsing to a certain site, etc. Or a button could be added to the browser tool bar permitting the researcher to, e.g., start, stop, pause, recording. Once the recording has started, the researcher 10 can use their browser as they previously did prior to starting up the recorder.

Opening a new child window or tab (110, FIG. 2) can create a new screencast S112. If the window continues to maintain active focus S114, events associated with the active window can be recorded S116. The events that are recorded include mouse clicks, selects, scrolls, hovers, keystrokes, etc.—in other words any form of user-related action (or inaction). Information associated with the events can include date and timestamp, web page context (addresses, etc.), value parameters, etc. These are mapped against the screencast. Everything that happens while the window has active focus is recorded.

Once the window loses active focus S114—NO, the recording of events for that window is stopped S118 and the screencast events are saved to a storage area in non-volatile media S120. If a new window is opened S122—YES, then a new screencast is created S112, and the process continues. Although the closing of the window or tab can serve as a trigger for completing a particular screencast, other triggering events are possible. For example, a screencast file could be closed and a new one created upon a timer expiration, upon a certain number of websites having been viewed, a particular web site being viewed, etc.

At periodical intervals (which can be adjustable) in a batch process, or on a user-initiated or system-initiated command, the screencast events, event logs, and other collected data 210 is transferred S124 to an abridging routine from the client 100 (FIG. 2) to the server 200. The abridging routine 250 operates on completed screencasts 210 to produce abridged videos 220.

Figure 2:
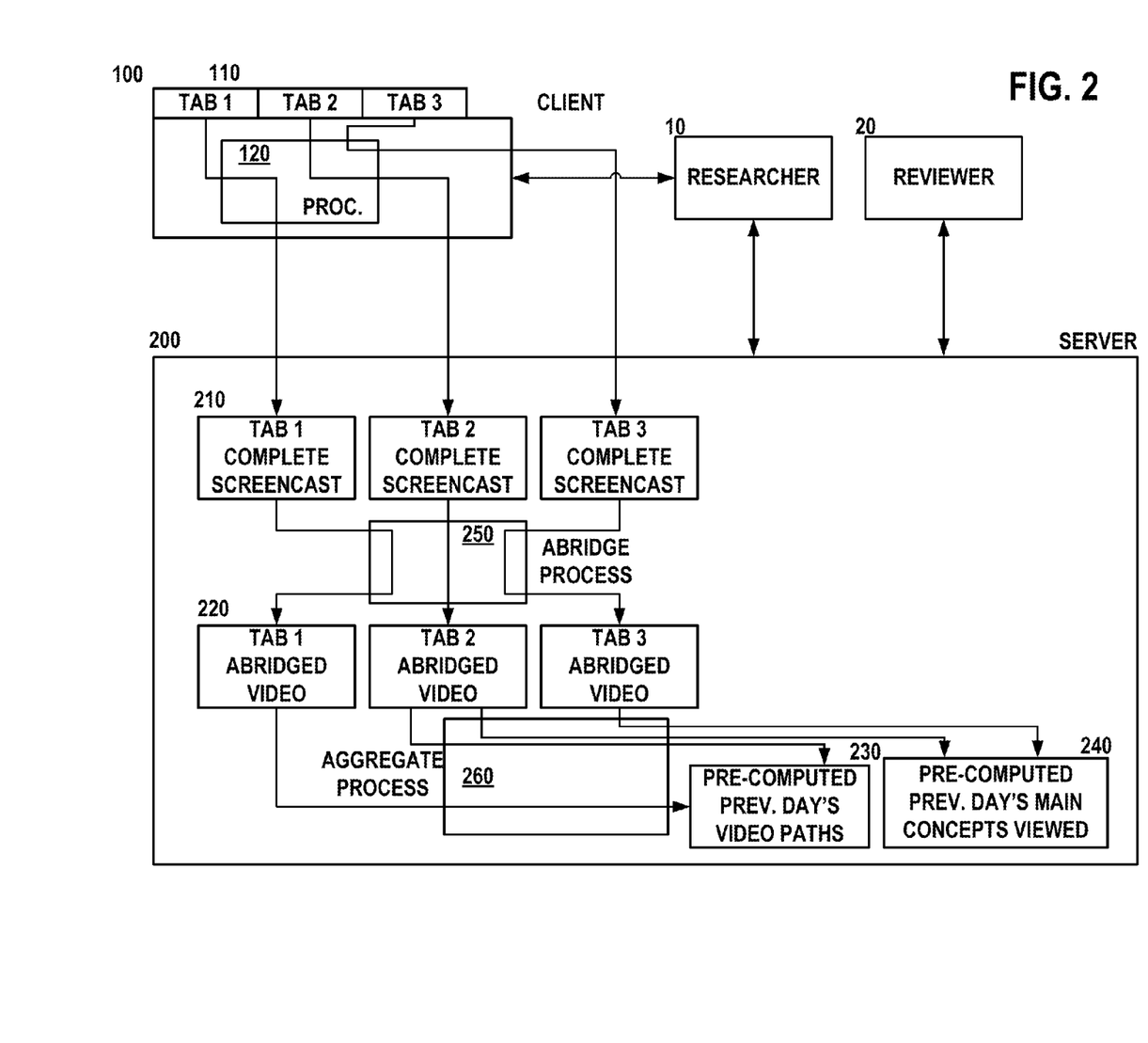
FIG. 2 is a block diagram illustrating an exemplary client-server architecture.

The server 200 can contain the video storage, logic to abridge the videos 250, and logic to pre-compute aggregated videos 260. The logic to pre-compute aggregated videos 260 can take as inputs any number of relevant abridged videos 200. As can be seen in FIG. 2, two different aggregate videos have been produced: a first is a pre-computed previous day's video paths 230 that is based on an abridged videos 220 produced from respective a screencasts 210 from a viewer's tab 1 and tab 2 browsing sessions. The pre-computed previous day's main concepts viewed 240 are similarly based on the abridged videos from the tab 2 and tab 3 browsing sessions.

The abridged video process 250 comprises two primary phases: 1) shrink down each tabbed (or windowed) session based on significant events; and then 2) stitch together related screencasts—for example, if a user clicked a link that went from one page to another page creating another tab or window. In an embodiment, there is a default buffer of time before and after each event so that the video can be composed in a smoother way. By default, each event type can specify the amount of buffer time added to the beginning and end of each event. For example, clicking on a link only takes a second, but the previous four seconds before and after the click can be preserved in the abridged screencast for continuity sake. This can permit, when editing, smoother transitions. Editing affects/blurs between jumpcuts and different screencasts can also be a configured default.

An important aspect is the event mapping that takes place on the client side in the processing 120. Any type of event that can be associated to interactions with a web page can be recorded. An example includes, if a user is scrolling fast through a long web page, but slows down through one section to read it and then speeds up again afterwards, the time period where they slowed down is marked with an event so that section of the video can be given higher priority. Another example includes, if a user watches a video on any part of the page that part of the video is noted and usually given higher priority—any clicked links may give that that section of the video higher priority.

The following table is illustrative of the types of events that may be logged.

TABLE 1

Possible Events to Log

| Event | Logged (all are time stamped) | Notes |
|---|---|---|
| New Windows | position, parent, name | Start client side recording |
| New URL | <URL>, tab name, parent | |
| Scroll down | | |
| Scroll up | | |
| Scroll pause | | |
| Scroll resume | | |
| Page down | | |
| Page up | | |
| Page pause | | |
| Page resume | | |
| Lose focus | | Ends client side recording |
| Text selection | selected text | |
| Viewed link | <URL> | |
| Clicked link | <URL> | |
| Page error | error text | |
| Window resize increase | coordinates | |
| Window size decrease | coordinates | |
| Volume off/on | | . . . or volume increase/decrease (and amount) |
| Center on rich media | | |
| rich media start/stop | | |
| Center on iframe | | |

The client process 120 can be configured by the researcher 10 and/or an administrator to provide additional control over the screencast recording. For example, parameters could be set that provide: 1) blacklist URLS (which URLs are never recorded)—e.g., advertisements; 2) whitelist URLS (which URLs are always recorded with high priority)—e.g., search engine searches; 3) maximum or minimum length of screencast (both initial screencast and final abridged output, and in terms of size, time (initial or abridged)); 4) blacklisted or whitelisted meta keywords; 5) auto publish conditions; and 6) automatic or manual mode.

Although the control as described above could take place in the client process at the point of recording or immediately thereafter, it is also possible that the abridge process 250 handles this aspect in producing the abridged videos 220 from the completed screencast 210. Further aspects of control could also be provided in the aggregate process 260. Furthermore, it is possible to provide the researcher 10 with additional control over the output. For example, the researcher could select which of the complete screencasts 210 (or portions thereof) should be included, or can manually chose to emphasize, deemphasize, certain portions. Full editing capabilities could be provided such as highlighting certain portions of a display (e.g., yellow-highlighting, arrows, circles, etc.), adding annotations, deleting certain segments. Any tools that can be used to edit video or images could be utilized to modify the screencasts.

Additionally (or alternately), the user editing tools could be provided for the researcher 10 (or other editor) on the abridged video files 220 after the abridge process 250 has run.

Figure 3:
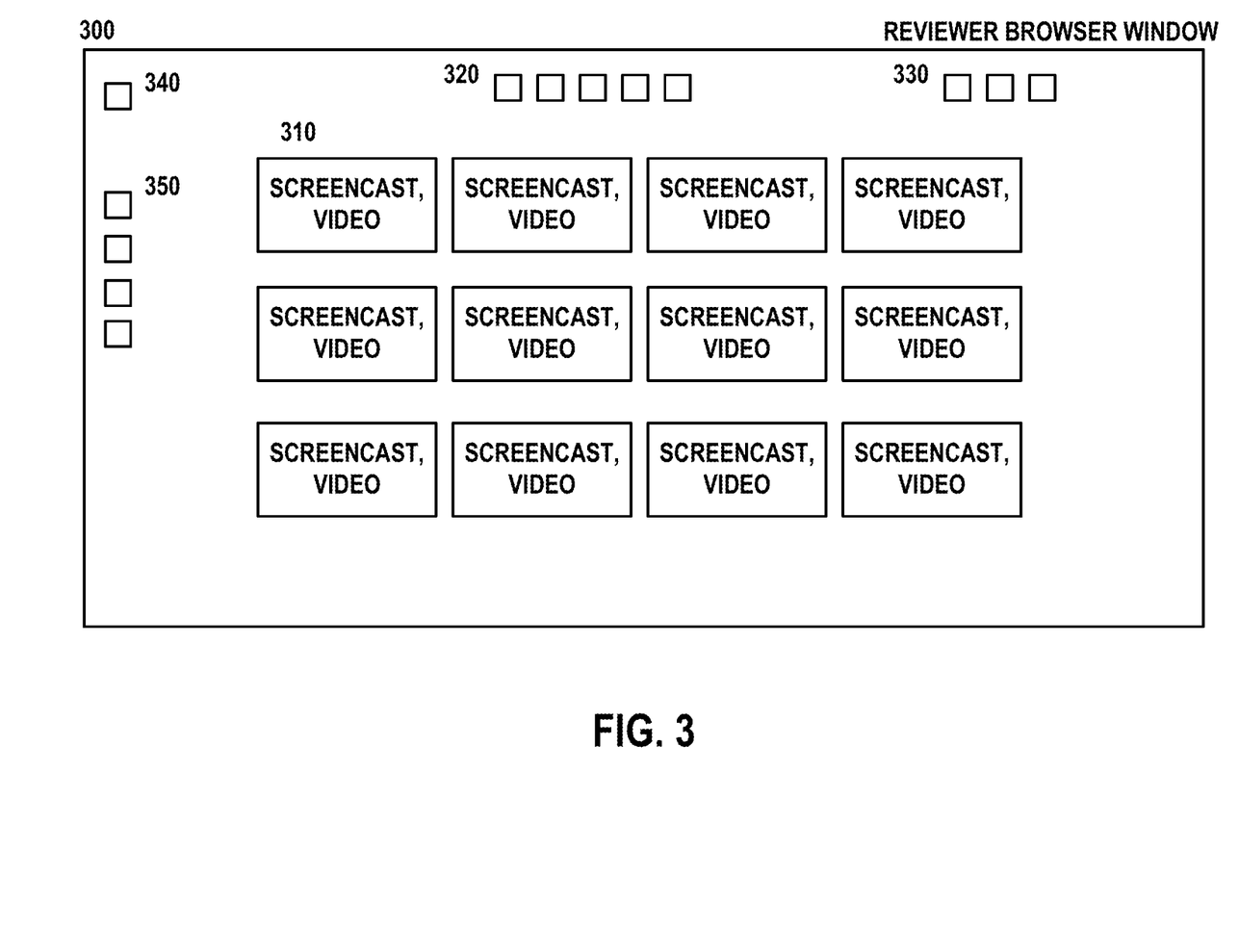
FIG. 3 is an exemplary screen view showing icons of captured screencasts/videos.

FIG. 3 is a screen shot of a display 300 illustrating an exemplary tool that can be used to select, view, edit, and otherwise process completed screencasts 210 and/or abridged video files 220. A screencast icon 310 representing the respective screencasts 210 or videos 220 can be provided on the display 300. View by icons 320 can be provided that allow viewing the screencasts by, e.g., path, time, concepts, etc., and can provide charts that summarize various information about the screencasts. View format icons 330 can also be provided that permit, e.g., thumbnail view, grid view, lets view, etc. A selection tool can also be provided that permits selection of various screencasts or all screencasts. A dashboard icon 340 can be provided that allows various filtering to be applied, such as date criteria, etc. Operation icons 350 can allow for designating certain screencasts as favorites, permitting tagging or sharing, or allowing the screencasts to be deleted. Other actions relative to the screencasts can be implemented as well. This permits users to see all of the screencasts that have been recorded as well as share/publish the ones they want if they are not already automatically shared. Default parameters can be set to define all of the functions associated with these screencasts 210 and abridged video files 220 and more.

Figure 4:
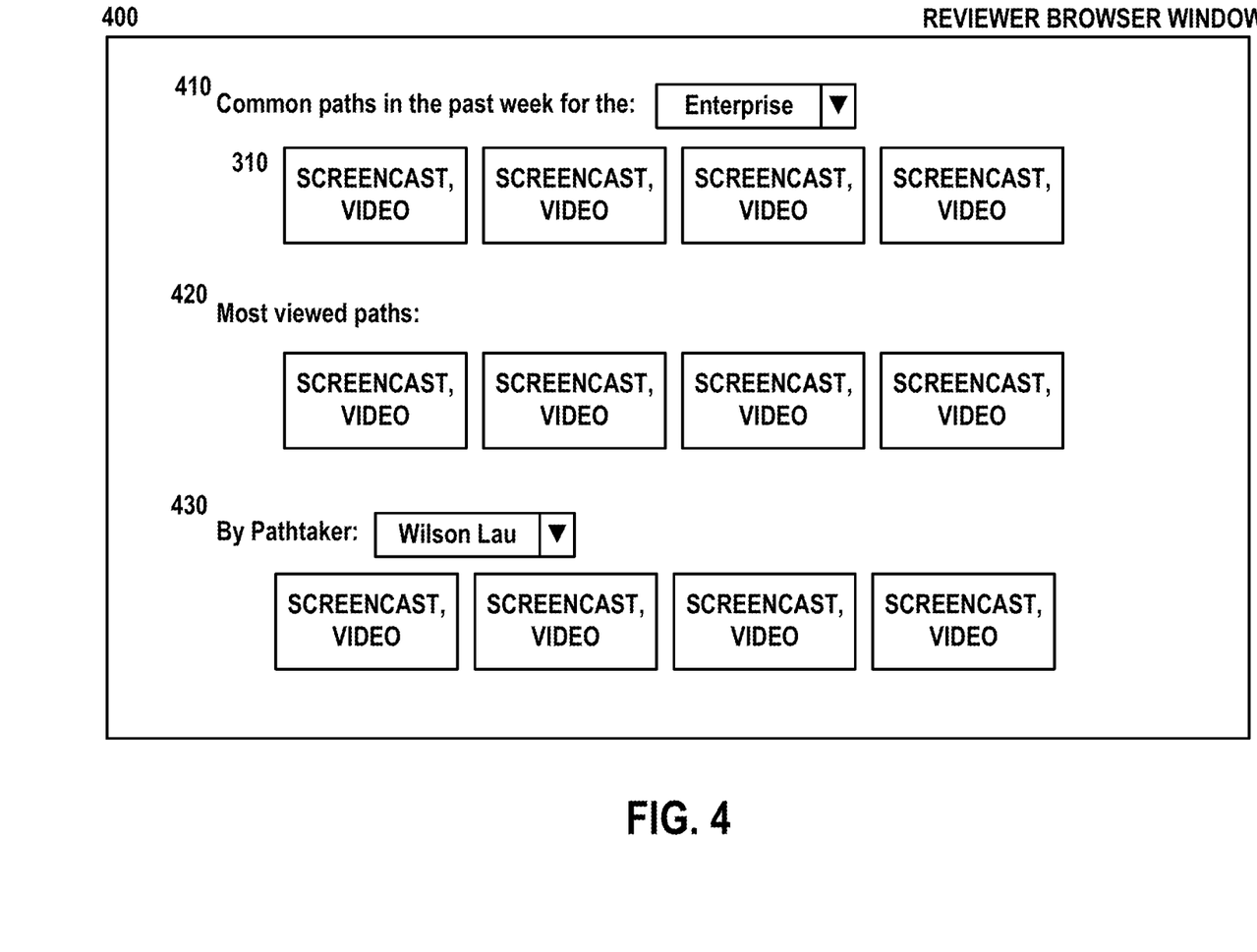
FIG. 4 is an exemplary screen view of a reviewer browser window.

Once a screencast has been recorded and possibly abridged, they can be shared with others and/or published where others can discover, search, and view them. FIG. 4 provides an exemplary reviewer/browser window that shows icons 310 for various screencasts 210 or videos 220. Algorithms located on the server 200 can organize the screencasts 210 or videos 220 in various ways. For example, an algorithm 230 can base an organization on a time frame (e.g., previous day, last week) 410 (and may include drop-down menus for further parameters, by main concepts 240, by popularity 420, by pathtaker/researcher name 430, or any other criteria.

The system or systems described herein may be implemented on any form of computer or computers and the components may be implemented as dedicated applications or in client-server architectures, including a web-based architecture, and can include functional programs, codes, and code segments. Although certain tasks may be designated herein as running on a client or server computer, such tasks can be also run on a server or client computer, respectively where it is possible to do so. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-volatile computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components that perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, embodiments of the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

TABLE OF REFERENCE CHARACTERS 10 researcher
20 reviewer
100 client/browser
110 browser window or tab
120 client software, browser plug-in
200 server
210 completed screencasts
220 abridged videos
230 pre-computed previous day's video paths
240 pre-computed previous day's main concepts viewed
250 abridged video process
260 aggregated videos
300 display/reviewer browser window
310 screencast icon
320 view by icons
330 view format icons
340 dashboard icon
350 operation icons
400 further display/reviewer browser window
410 organization based on time frame
420 organization by popularity
430 organization by pathtaker/researcher name

What is claimed is:

1. A computer-implemented method for sharing web pages, comprising:
   at a client computer system having one or more processors that execute one or more programs stored in a memory of the client computer system:
   generating a representation of a web page that is displayed in a window of a web browser in a user interface of the client computer system;
   recording a screencast of the web page over a period of time, the screencast including web page changes resulting from input events;
   recording each input event along with a corresponding time stamp; and
   storing the screencast, the input events and the timestamps in a screencast file;
   at either the client computer system or a server computer system:
   extracting screencast portions related to selected time stamps based on a buffer time added to the beginning and end of the input event from the screencast file; and
   assembling the screencast portions to generate an abridged video recording;
   wherein the buffer time associated with each input event is based on a type of the input event.

2. The method of claim 1, wherein the input events are selected from the group consisting of mouse or pad clicks, keystrokes, scrolling, and voice commands.

3. The method of claim 1, wherein recording the screencast comprises:
   initiating the recording by creating the screencast file when a new web browser window or tab is opened; and
   closing the screencast file when the web browser window or tab is closed.

4. The method of claim 1, wherein assembling the screencast portions comprises combining a plurality of screencast portions from a plurality of screencast files.

5. The method of claim 1, wherein recording the screencast comprises recording the screencast using a plug-in to the web browser.

6. The method of claim 1, wherein assembling the screencast portions further comprises abridging the screencast portions.

7. The method of claim 6, wherein assembling the screencast portions comprises stitching together the abridged screencast portions.

8. The method of claim 7, further comprising:
   saving a buffer time before and after each event that is utilized in the stitching to create smooth transitions.

9. The method of claim 1, further comprising:
   transferring transmitting the screencast files to a server computer connected over a wide-area network to the client computer;
   wherein at least part of assembling the screencast portions is performed on the server computer.

10. The method of claim 9, wherein transmitting the screencast file occurs at predefined intervals and at least part of the transmitting is performed in a batch process on a plurality of screencast files.

11. The method of claim 1, further comprising setting parameters for recording the screencast selected from the group consisting of:
    utilizing predefined blacklist URLs that are never recorded;
    utilizing predefined whitelist URLs that are always recorded;
    utilizing a predefined maximum or minimum length of a screencast file;
    utilizing a predefined blacklist metadata keyword list for web pages that are never recorded; and
    utilizing a predefined whitelist metadata keyword list for web pages that are always recorded.

12. The method of claim 1, wherein extracting the screencast portions comprises selecting the screencast portions of the screencast by a researcher who generated them.

13. The method of claim 1, further comprising:
    annotating or highlighting portions of the screencast portions by a researcher who generated them.

14. The method of claim 1, further comprising:
    at least one of emphasizing and deemphasizing portions of the screencast portions by a researcher who generated them.

15. A computer system for sharing web pages, comprising:
    one or more processors that execute one or more programs stored in a memory of the computer system:
    a generating unit that generates a representation of a web page that is displayed in a window of a web browser in a user interface of the client computer system;
    a recording unit that records the web page over a period of time into the memory, the recording including web page changes resulting from input events to create a screencast over the period of time, wherein each input event is recorded along with a time stamp corresponding with the input event and, and the screencast, the input events, and the time stamps are stored in a screencast file;

an extracting unit that extracts screencast portions related to selected time stamps events based on a buffer time added to the beginning and end of the corresponding input event from the screencast file; and an assembly unit that assembles the screencast portions to generate an abridged video recording;

wherein the buffer time associated with each input event is based on a type of the input event.

16. A non-transitory computer program product, comprising a computer usable medium having a computer readable program code embodied therein, said computer readable program code adapted to be executed to implement sharing of web pages, comprising:

at a client computer system having one or more processors that execute one or more programs stored in a memory of the client computer system:

generating a representation of a web page that is displayed in a window of a web browser in a user interface of the client computer system;

recording a screencast of the web page over a period of time, the recording including web page changes resulting from input events;

recording each input event along with a time stamp corresponding with the input event, wherein the screencast, the input events, and the time stamps are stored in a screencast file; and at either the client computer system or a server computer system:

extracting screencast portions related to selected time stamps based on a buffer time added to the beginning and end of the corresponding input event from the screencast file; and assembling the screencast portions to generate an abridged video recording;

wherein the buffer time associated with each input event is based on a type of the input event.

* * * * *

UNITED STATES PATENT AND TRADEMARK OFFICE
CERTIFICATE OF CORRECTION

Page 1 of 1

PATENT NO. : 9,558,281 B2
APPLICATION NO. : 14/040039
DATED : January 31, 2017
INVENTOR(S) : Brian Meckler and Wilson Lau It is certified that error appears in the above-identified patent and that said Letters Patent is hereby corrected as shown below:

In the Claims

Column 9, Line 3, delete "event and, and" and insert therefor --event, and--.

Signed and Sealed this
Nineteenth Day of March, 2019

Andrei Iancu
*Director of the United States Patent and Trademark Office*